(12) United States Patent
Silverbrook et al.

(10) Patent No.: US 6,276,850 B1
(45) Date of Patent: Aug. 21, 2001

(54) STICKER PRINTING CAMERA DEVICE

(75) Inventors: Kia Silverbrook, Balmain; Tobin Allen King, Cremorne, both of (AU)

(73) Assignee: Silverbrook Research Pty Ltd, Balmain (AU)

( * ) Notice: Subject to any disclaimer, the term of this patent is extended or adjusted under 35 U.S.C. 154(b) by 0 days.

(21) Appl. No.: 09/437,036

(22) Filed: Nov. 9, 1999

(30) Foreign Application Priority Data

Nov. 9, 1998 (AU) .................................................. PP7027

(51) Int. Cl.[7] ........................... G03B 17/22; G03B 17/02; B41J 11/70
(52) U.S. Cl. ........................ 400/615.2; 400/613; 400/88; 396/6; 396/429; 396/445; 347/2
(58) Field of Search ................................... 400/615.2, 62, 400/88, 613; 347/2; 396/6, 445, 429

(56) References Cited

U.S. PATENT DOCUMENTS

| 5,692,225 | * | 11/1997 | Bernardi et al. ..................... 396/318 |
| 5,757,388 | * | 5/1998 | Stephenson .............................. 347/2 |
| 5,816,718 | * | 10/1998 | Poole ...................................... 400/88 |
| 5,847,836 | * | 12/1998 | Suzuki ................................. 358/296 |
| 5,999,203 | * | 12/1999 | Cane et al. ........................... 347/171 |
| 6,019,461 | * | 2/2000 | Yoshimura et al. ................... 347/86 |
| 6,087,638 | * | 7/2000 | Silverbrook .......................... 219/540 |
| 6,152,619 | * | 11/2000 | Silverbook ............................. 400/88 |
| 6,163,361 | * | 12/2000 | McIntyre et al. .................... 347/214 |

FOREIGN PATENT DOCUMENTS 10-294918 * 11/1998 (JP) .

* cited by examiner

Primary Examiner—Daniel J. Colilla (57) ABSTRACT

A sticker printing digital camera device includes a generally circular housing which is suitable for storing a roll of sticker material. A sticker feed mechanism is mounted in the housing for feeding the sticker material from the housing. An image sensor is positioned in the housing for sensing an image. An internal ink jet printhead is operatively associated with the image sensor and is adapted to print the sensed image or a modification thereof on to a sticker delivered by the sticker feed means. An ink delivery arrangement is positioned in the housing to deliver ink to the printhead.

6 Claims, 11 Drawing Sheets

STICKER PRINTING CAMERA DEVICE

FIELD OF THE INVENTION

The present invention relates to printing systems and more particularly to a hand held printer and camera device for printing camera images on to stickers.

SUMMARY OF THE INVENTION

In accordance with the invention there is provided a sticker printing digital camera device, said device including:

- sticker storage means;
- sticker feed means;
- an image sensor for sensing an image;
- an internal ink jet printhead operatively associated with said image sensor and adapted to print on to a sticker delivered by said sticker feed means said sensed image or a modification thereof;
- an ink supply; and
- means to deliver ink to said printhead.

Preferably, the device is sized and packaged so as to be readily portable and more preferably so as to be hand held.

The sticker printer and camera device can further comprise image effect setting means for setting an image effect to be applied to the sensed image; and image processing means interconnected to the image effect setting means and the image sensor and adapted to modify the sensed image in accordance with the current setting of the image effect setting means.

The image effect setting means can comprise a dial or a slider having a number of effect images indicated thereon: The sticker supply and the ink supply are preferably replenishable and at least one preferably includes an associated authentication system.

Cutting means for severing printed portions of the printed stickers may also be provided.

Preferably the printhead is a pagewidth printhead.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

The preferred embodiment comprises a sticker printing camera able to print stickers on demand on a replenishable print roll. The "stickercam" 1 as illustrated in the accompanying figures has a multi-part housing defined by an external front cover 2, an internal sub-structure and rear 3, a sticker and ink cartridge molding 4 and an external rear cover 5.

The housing in the illustrated preferred form is generally tear drop shaped in elevation. A generally circular portion 6 of the housing is being adapted to store stickers in a print roll form. A remaining portion houses an ink supply 7, a printhead arrangement 8 and a sticker feed mechanism 9.

A view finder 10 is also disposed at or near a centre of the circular housing portion 6 and extends fully through the housing from the front cover 2 to an optional eye piece 11 on the rear. Provided immediately below the view finder 10 is a camera lens 12 which is operatively associated with an image sensing and processing means such as the CCD 13 shown in FIG. 12. Further, a "take" button 14 is provided at the top of the casing together with a "print" button 15 for taking and printing images respectively.

The preferred embodiment also includes an "effects dial" 16 which is rotatable so as to implement a series of effects such as normal, black and white, sepia, soft blending, etc. It can also be used for the addition of graphical clip arts such as love hearts, flowers, surprise effects etc. On the dial, a series of icon pictures may be provided on which is printed an indicator of the effect. The effect placed at the indicator marker 17 is the one then applied by the camera. The effect dial can be implemented by placing a series of conductive segments on the reverse side of the wheel with the conductive segments forming a binary pattern indicative of the type of effect to be displayed. The segments can complete a circuit monitorable by the electrical circuitry so as to provide for the selected effect.

In the preferred form, the stickers are provided in the form of a sticker roll 18 which is housed in a cartridge 19 which is releasably secured to the housing. The cartridge 19 is of a similar shape and structure to the housing and comprises a top molding 20 which defines a generally annular sticker roll containing portion 21 with a generally triangular ink storage portion 22. The ink storage portion 22 is preferably divided into a plurality of distinct chambers 23 so as to provide for both color and black and white printing. Two slots are also provided in a side wall of the cartridge top molding 20, the first being a sticker exit slot 24 and the second being a pick up roller slot 25 which forms part of the sticker feed mechanism 27 that is described in more detail below. The cartridge 19 also includes a base molding 28 which seals both a sticker roll cavity and the ink chambers 23. Preferably, ink outlet perforations 29 are provided in the base molding and are covered by a sealing film that is pierced during installation so as to be in fluid communication with a printer mechanism 30. Desirably, the cartridge is a sealed unit such that the stickers and ink supply can be replenished simultaneously. Conveniently, the cartridge may be snap fitted with the external housing by means of pressure snap mounts 31 shown in the drawings.

Figure 1:
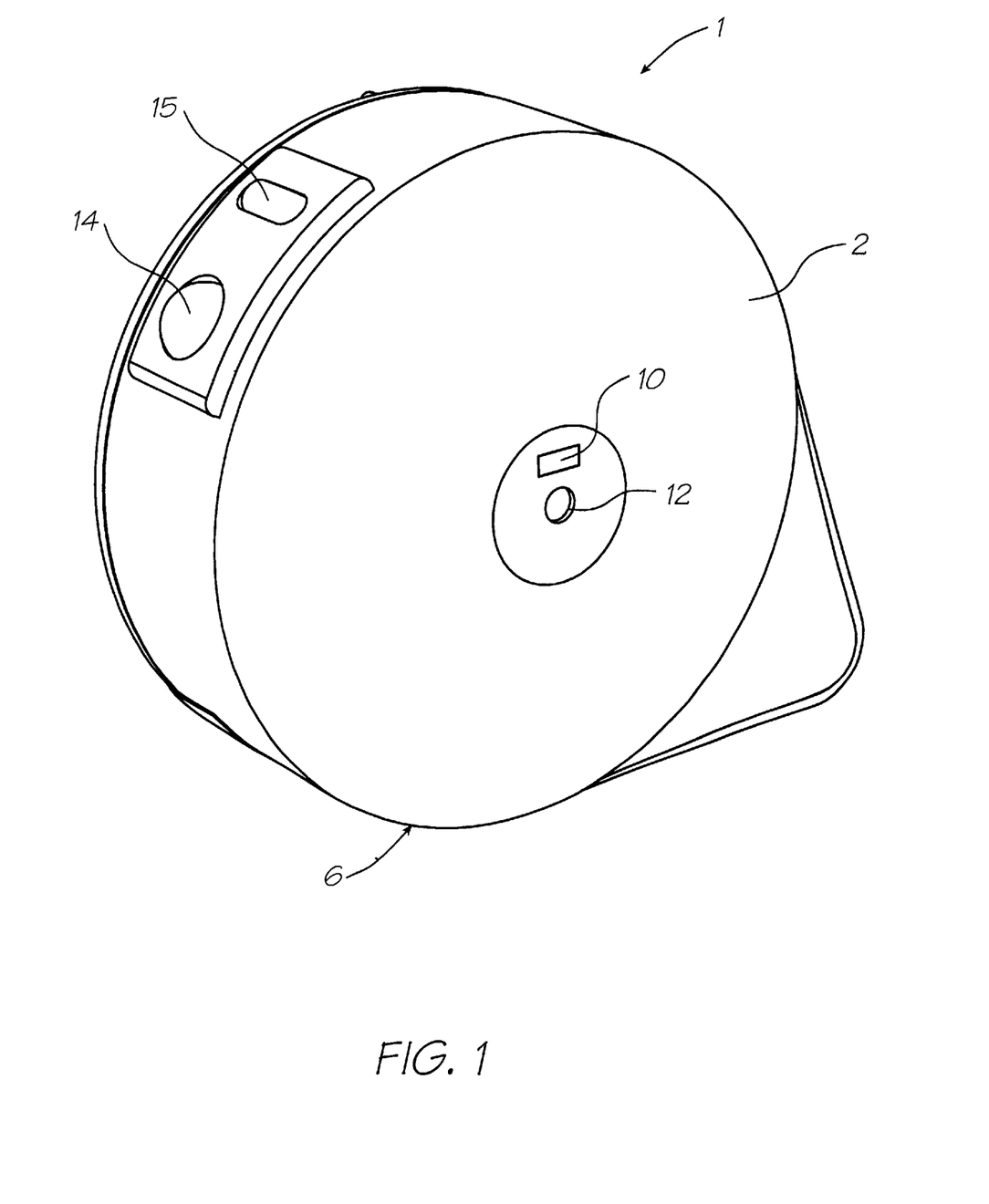
FIG. 1 is a front perspective view of the sticker printing camera.
Figure 2:
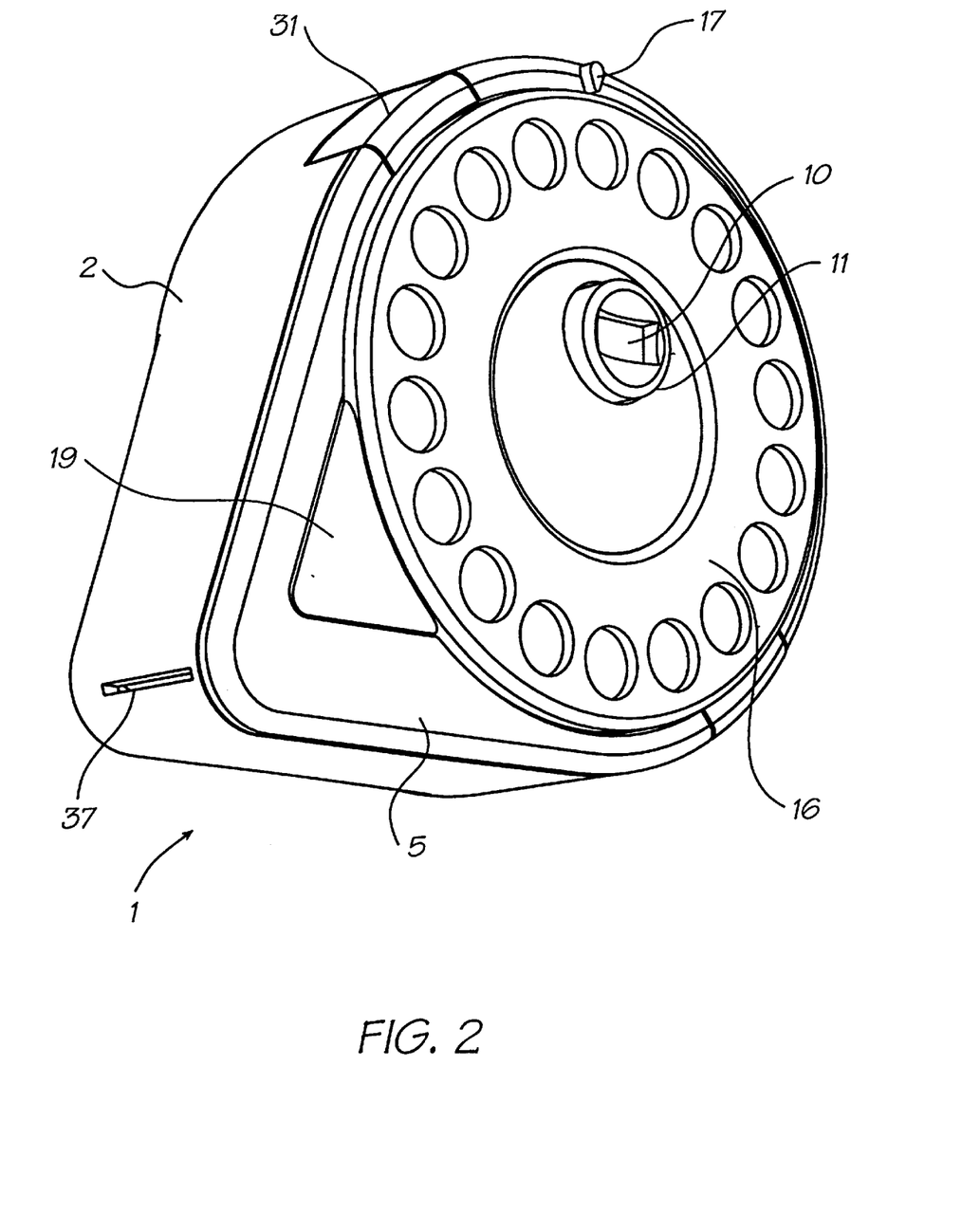
FIG. 2 is a rear perspective view of the sticker printing camera of FIG. 1.
Figure 3:
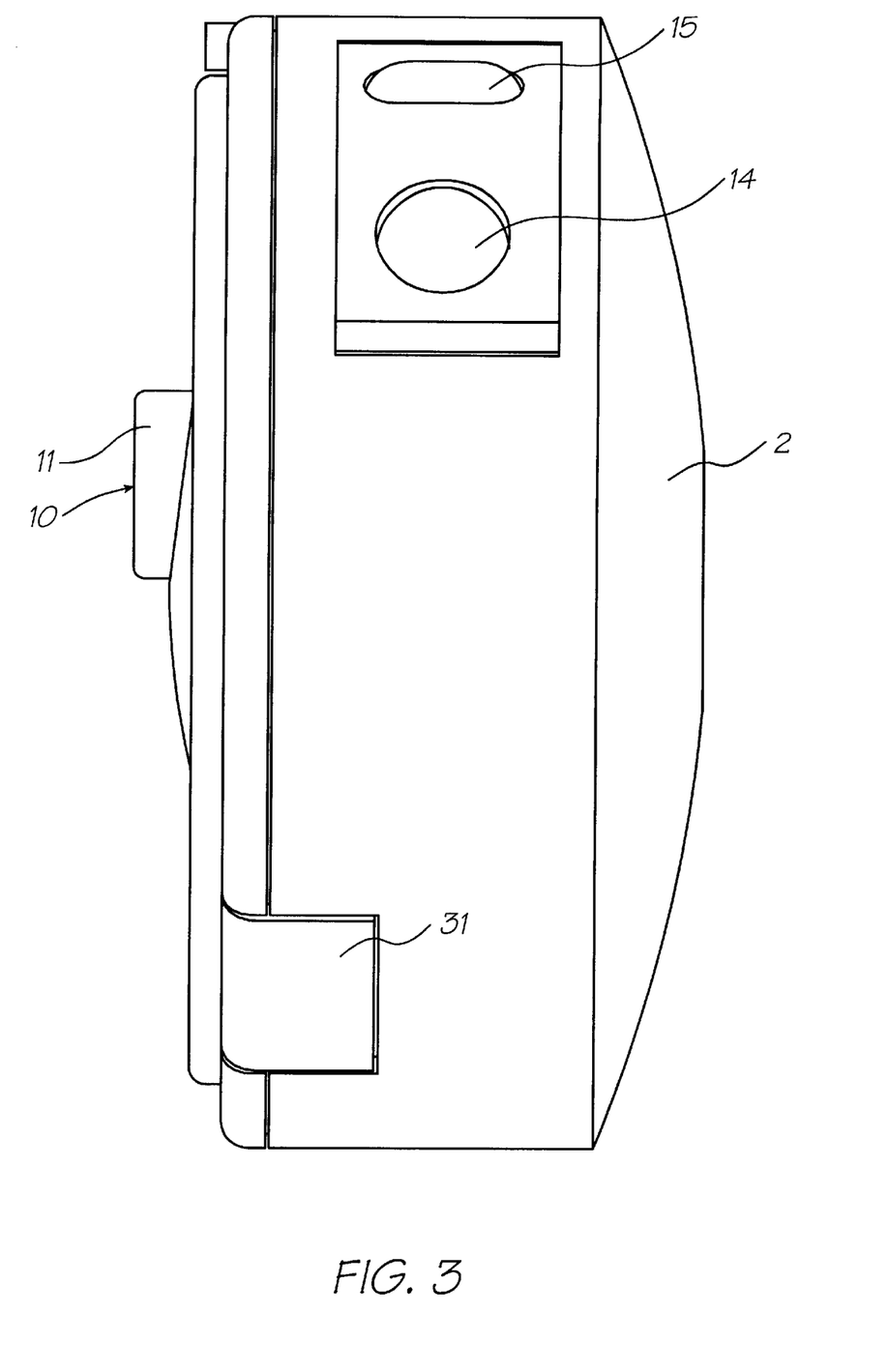
FIG. 3 is a left hand side view of the sticker printing camera of the previous figures.
Figure 4:
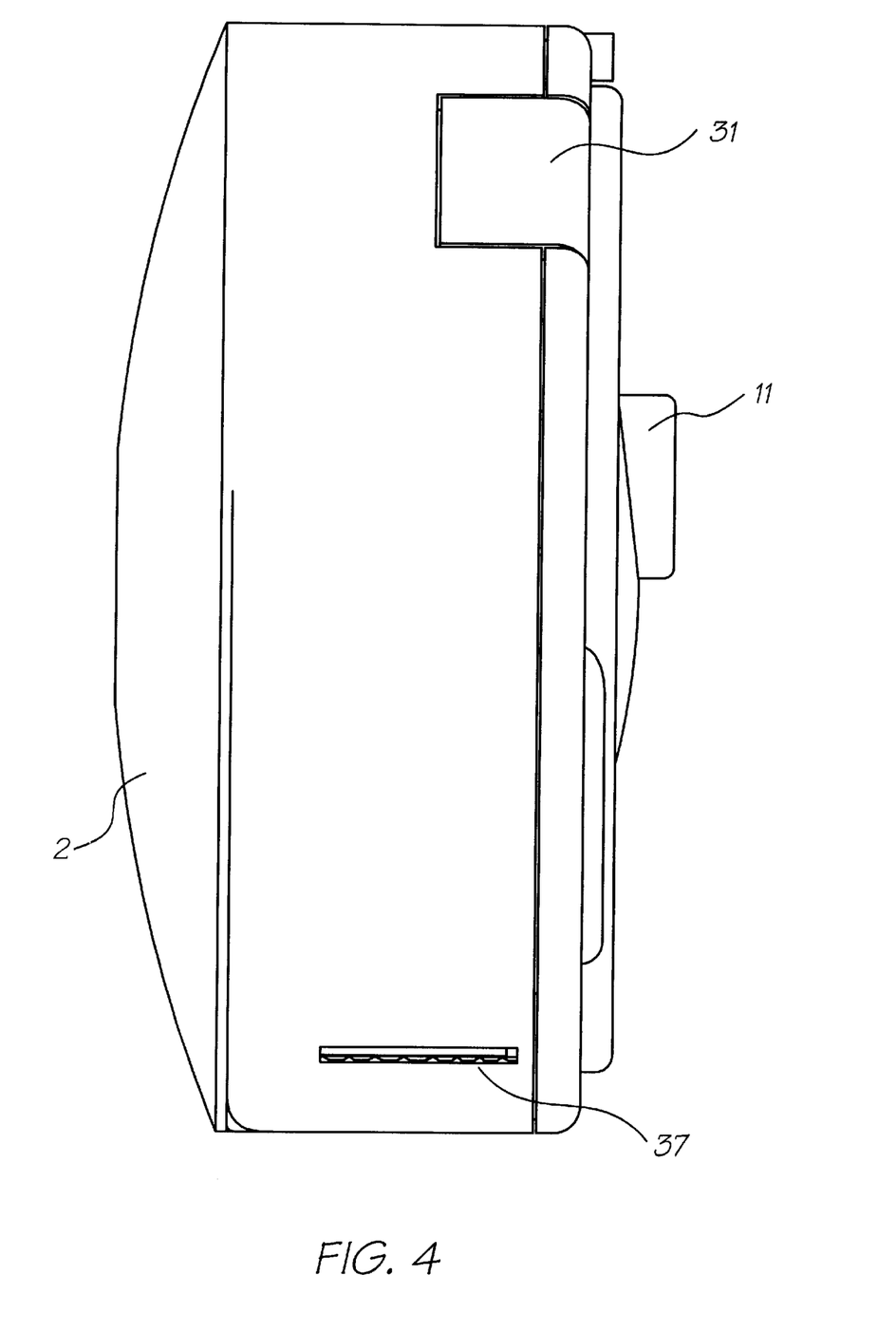
FIG. 4 is a right hand side view of the sticker printing camera of the previous figures.
Figure 5:
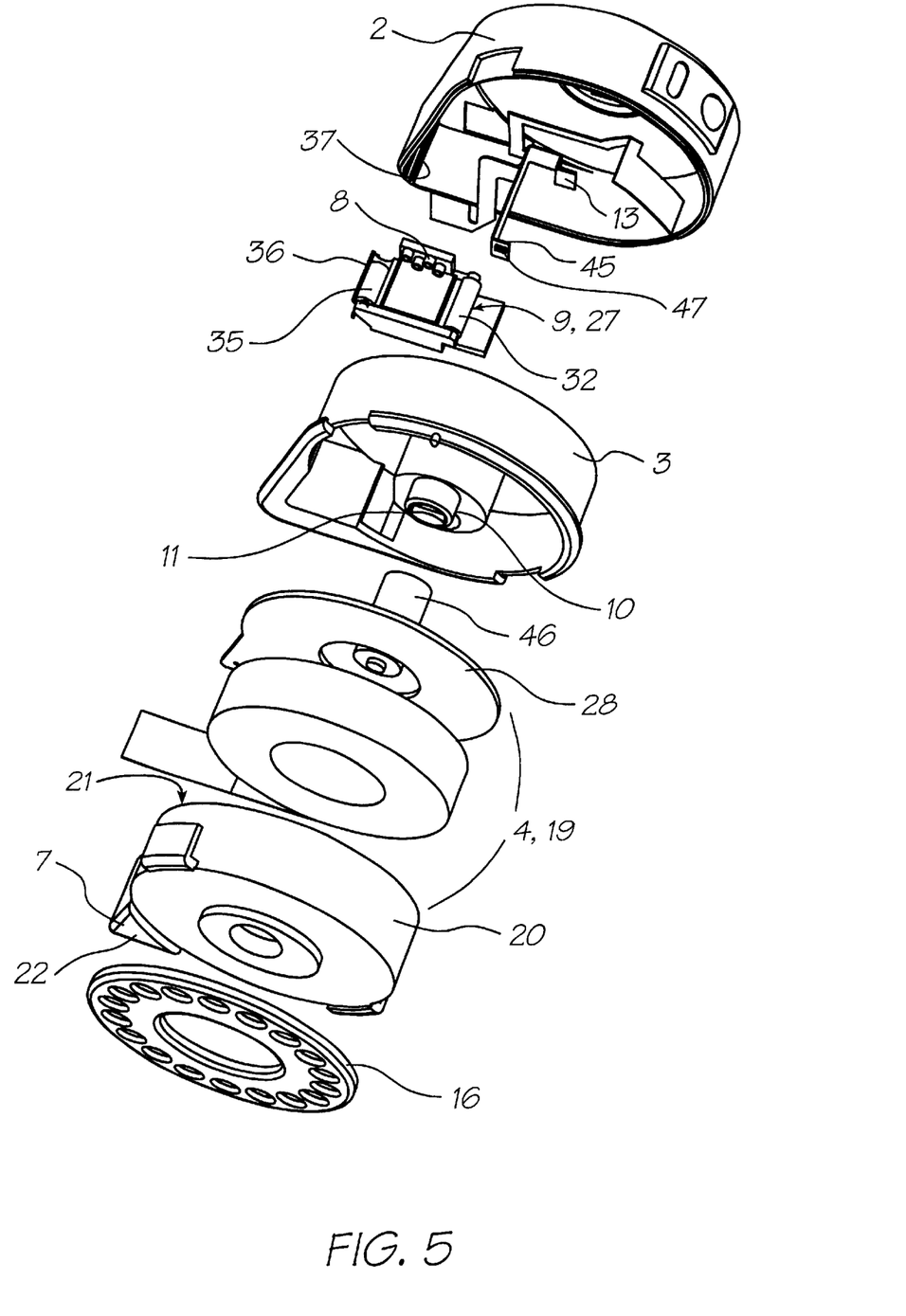
FIG. 5 is an exploded perspective view of the sticker printing camera device as shown in FIG. 1 including the sticker print roll and ink cartridge.
Figure 6:
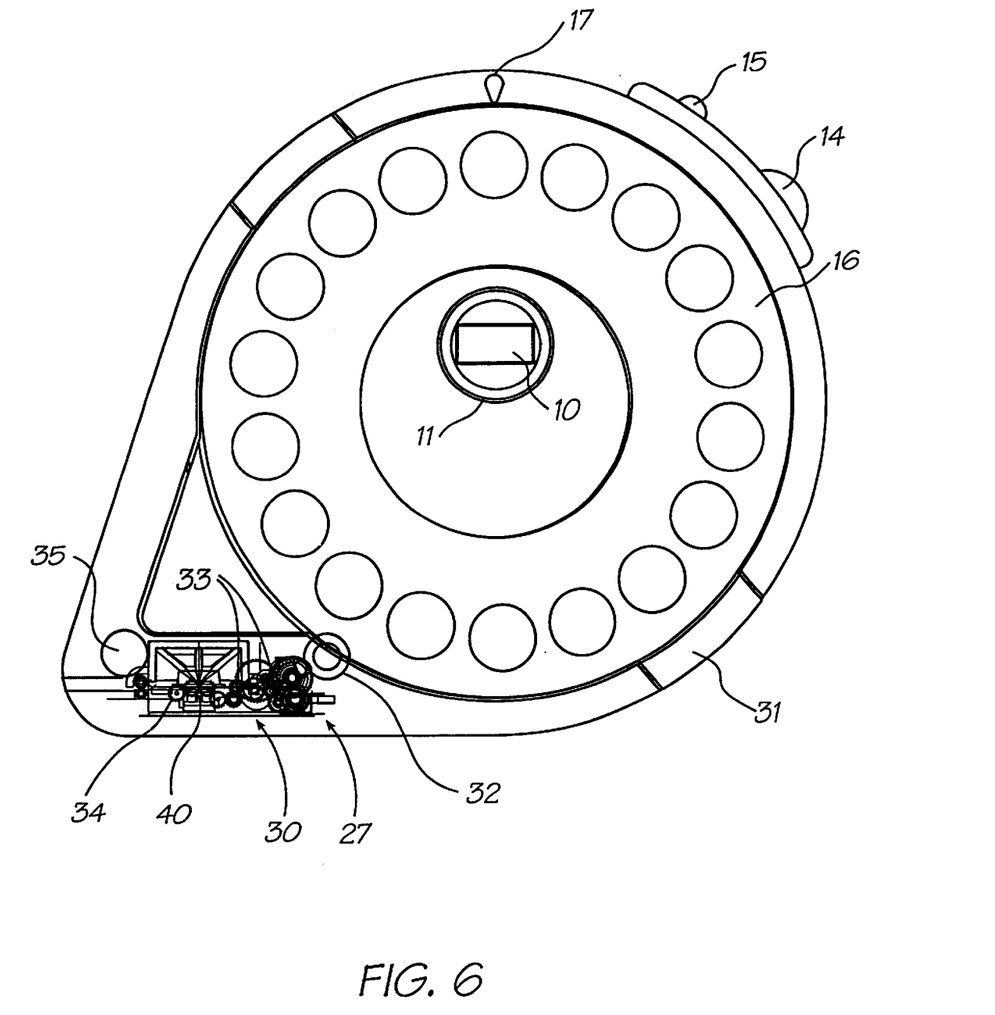
FIG. 6 is a rear view of the sticker printing camera from the previous figures with the uppermost cover portions removed to illustrate the sticker storage area, ink supply, feeder and printer mechanism.

The sticker feed mechanism 27 and printer mechanism 30 are best illustrated in FIGS. 2, 5, 7, 9 and 12. The sticker feed mechanism 27 includes a pick up roller 32 which spools the stickers forward once the cartridge has been inserted in the outer housing. Adjacent the pick up roller are several pairs of drive rollers or nip rollers 33 which are operated via an appropriate gear chain 34 by a motor 35 (FIG. 6). A serrated cutter 36 (FIG. 12) is also provided as part of the feed sub-assembly and arranged so as to be adjacent a printed sticker outlet 37 that is formed as part of the housing front cover 2. Alternatively, a guillotine type arrangement could be provided.

Figure 7:
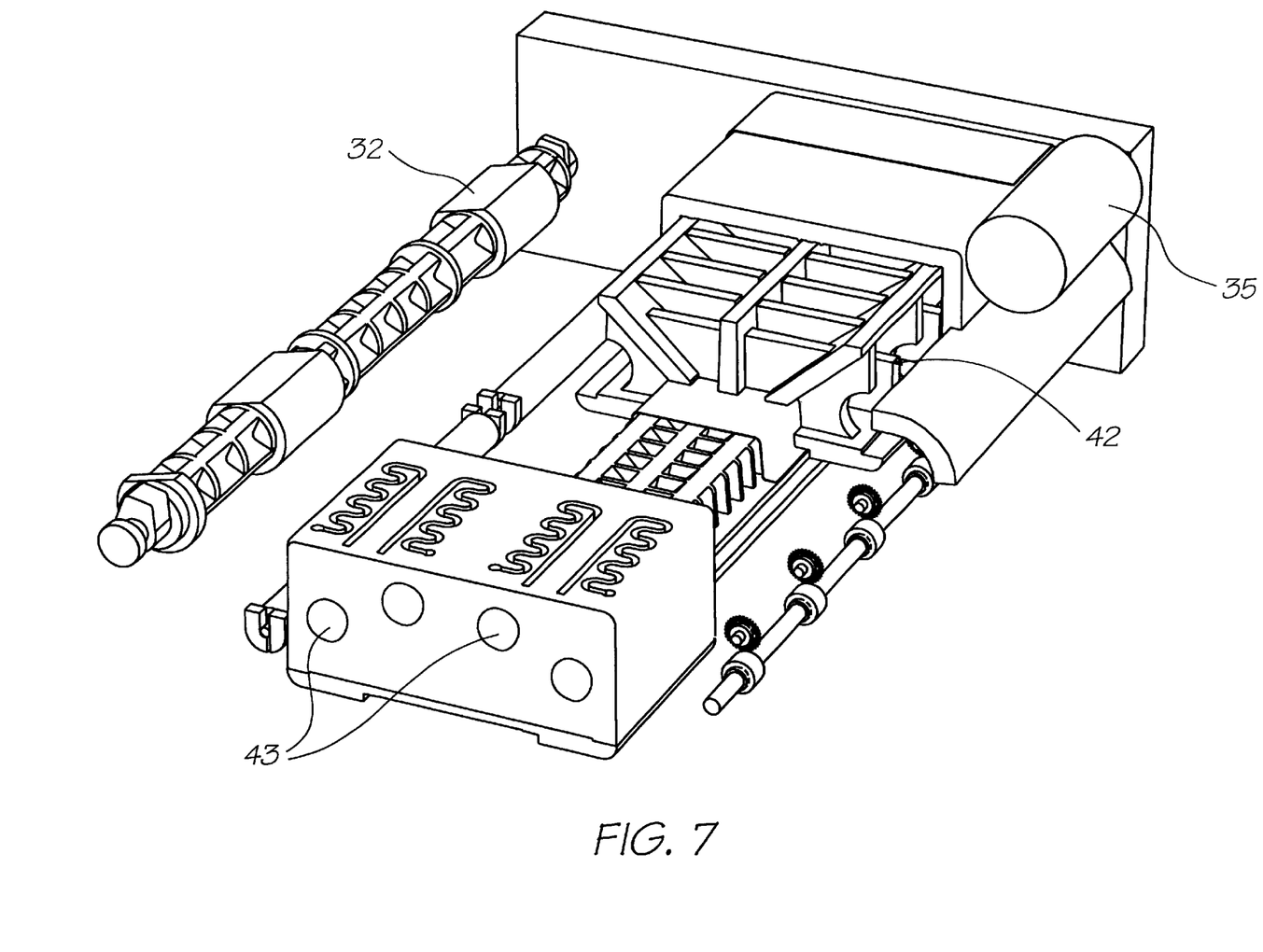
FIG. 7 is an enlarged perspective view of the printer mechanism shown in FIG. 6.
Figure 8:
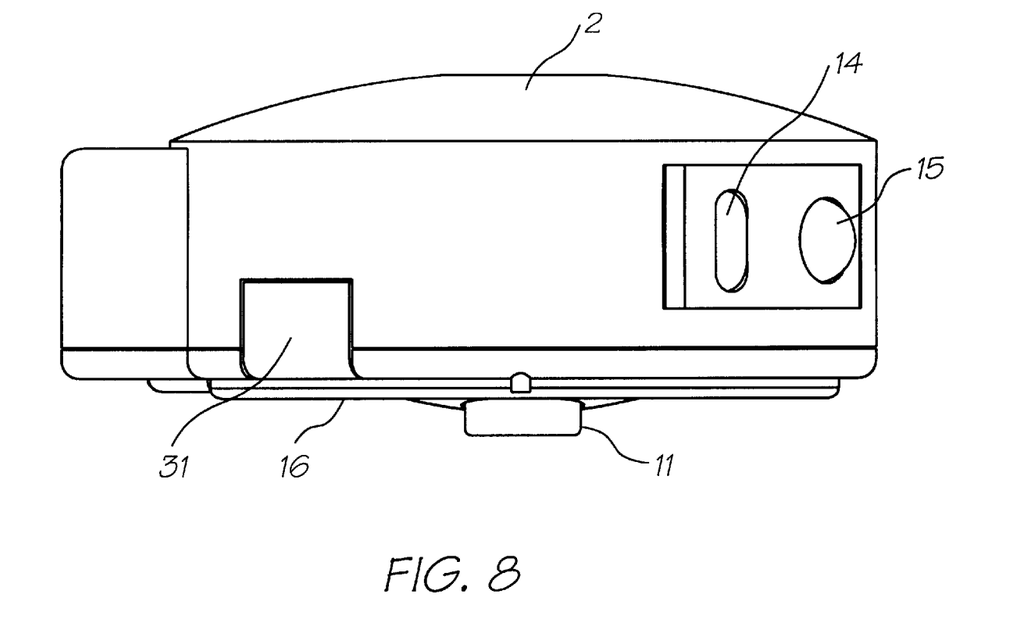
FIG. 8 is a top plan view of the device shown in FIGS. 1–5.
Figure 9:
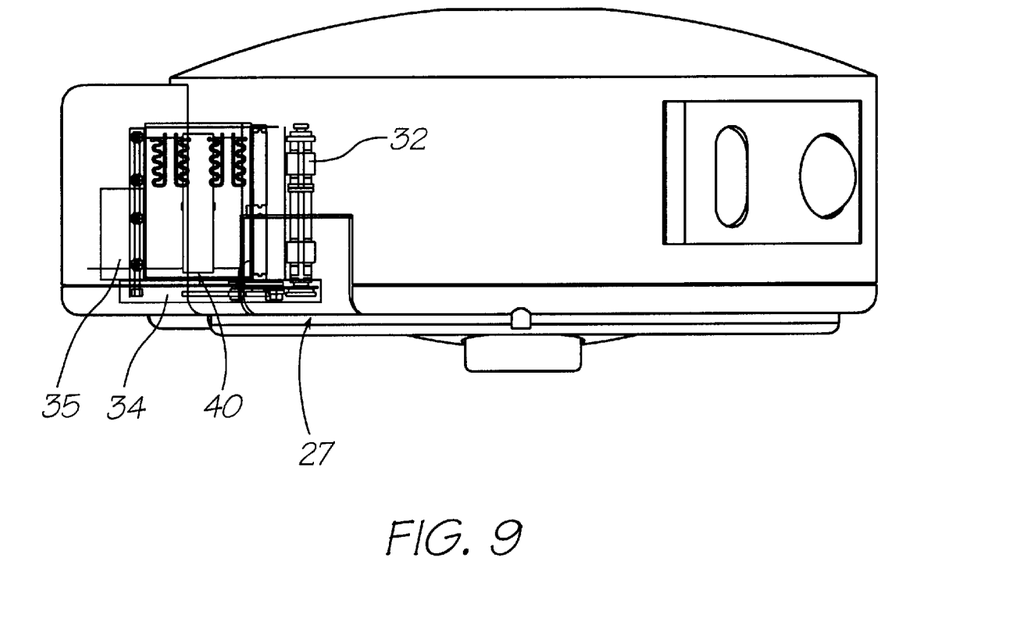
FIG. 9 is a part sectioned top plan view showing detail of the printer mechanism shown in FIGS. 6 and 7.
Figure 10:
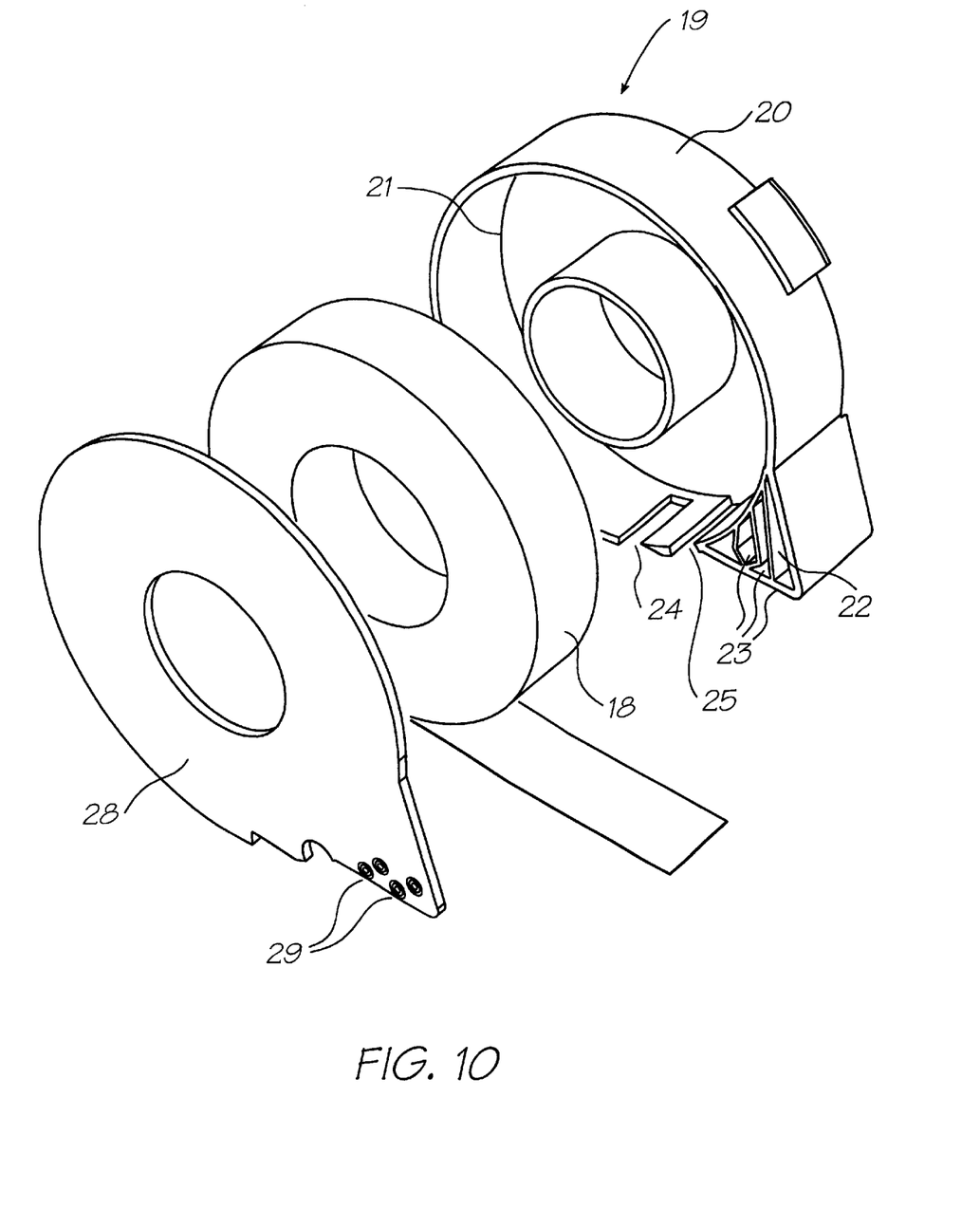
FIG. 10 is an exploded perspective view of the sticker roll and ink cartridge.
Figure 11:
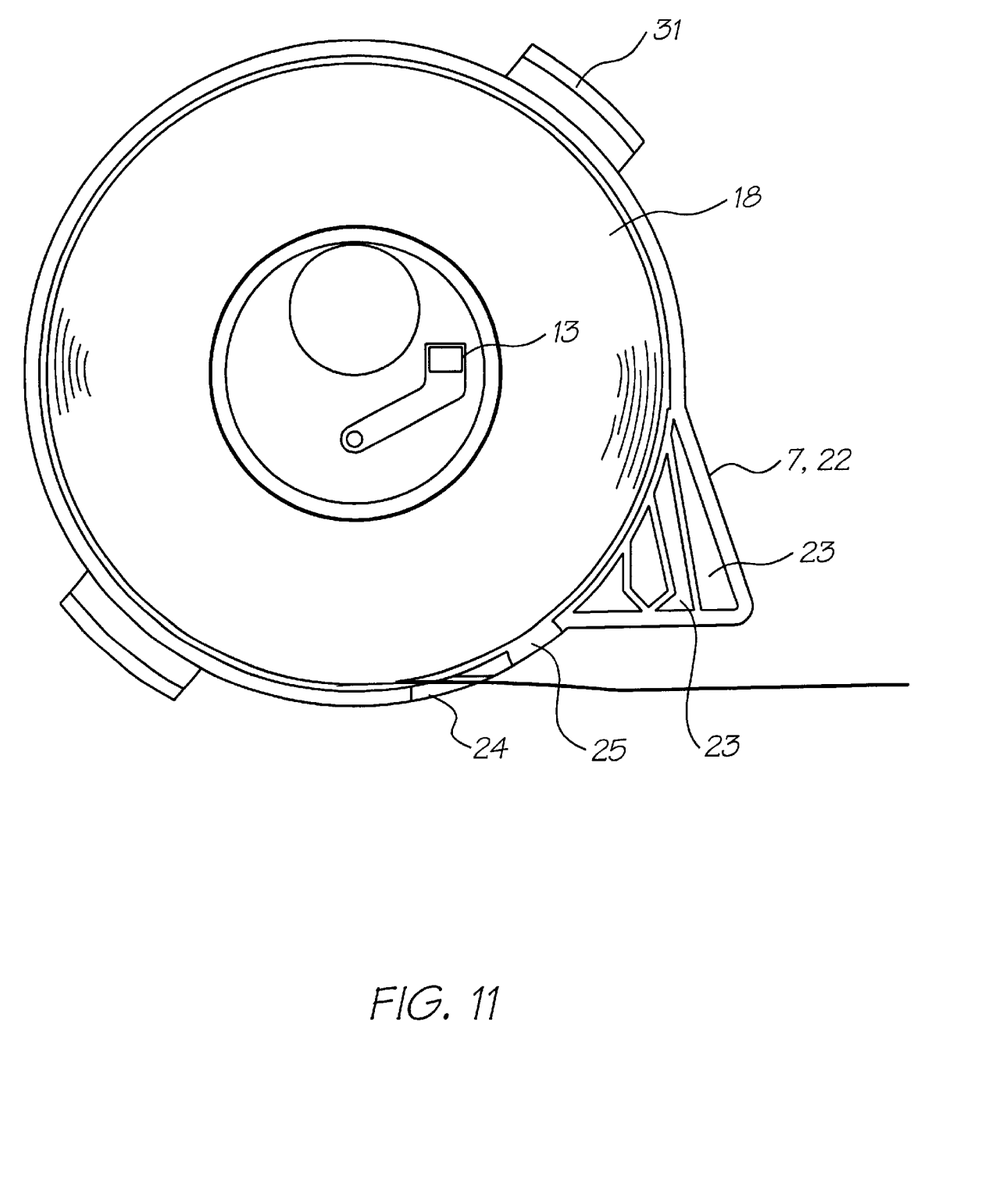
FIG. 11 is a front view of the sticker roll and ink cartridge shown with the base moulding removed.

The printer mechanism 30 is best shown in FIGS. 6 and 7 and comprises a page width printhead chip 40 with an ink distribution unit 41. Forming part of the ink distribution unit 41 is an ink supply connection manifold 42 which has a plurality of ink inlet projections 43 which engage the ink outlet perforations 29 on the sticker roll and ink cartridge 19. Preferably, the printer mechanism and sticker feed mechanism are a single unit and are detachable for replacement or repair.

Figure 12:
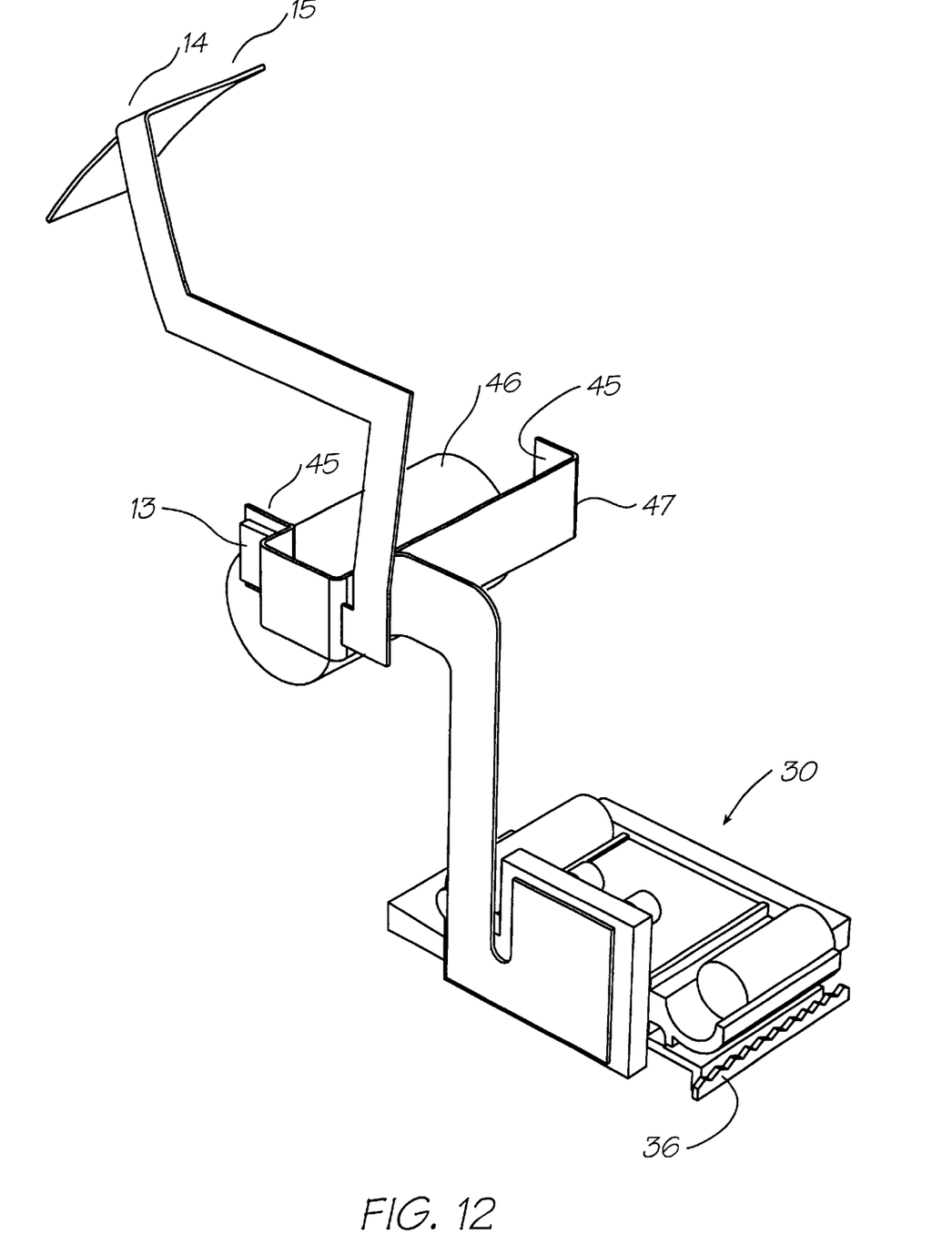
FIG. 12 is a front view showing the interaction of the cartridge with the printer mechanism.

Turning now to FIG. 12 (and FIG. 5), there is shown a schematic arrangement of a part of the electrical circuitry for the control and operation of the stickercam device. As can be seen, a simple flexible PCB harness can be used to interconnect the take and print buttons 14 and 15 to the CCD 13 and the printer mechanism 30. Also provided as part of the circuit are contacts 45 for the power supply which is preferably in the form of a three volt battery 46. Further, the preferred embodiment includes an authentication mechanism such as that outlined in applicant's earlier PCT application number entitled "A camera with an internal printing system". The authentication chip contact 47 is shown in FIG. 12.

In use, the "stickercam" is oriented toward the target subject and the take button 14 is then operated to capture the image. The effects dial 16 can then be rotated and an effect selected. When the print button 15 is then operated the sticker feed mechanism 27 delivers the next sticker or portion of sticker media to the printhead assembly 30 for printing of the effect processed image thereon.

Numerous variations are possible within the overall inventive concept. For example, the printhead unit can be a suitable adaptation of that outlined in the Australian provisional patent application number PP7021 entitled "Image Creation Method and Apparatus (ART 79)" filed concurrently herewith by the present applicant, the contents of which are hereby incorporated by cross reference. U.S. application Ser. No. 09/436,589 claims priority from this provisional patent application. Alternatively, the preferred embodiment can be implemented as a rearrangement of the system disclosed in PCT patent application PCT/AU98/00549 (WO 99/04551) entitled "A Replenishable One Time Use Camera System" also filed by the present applicant. Advantageously, the image sensor can be of a reduced size to that described in the above referenced PCT application due to the small size of the stickers.

Similarly, the electronics of the stickercam can be based around a CMOS image sensor which also includes processing circuitry for processing an image and forwarding it to the printhead 12 for printing. The operation of the internal control electronics can be substantially as set out in the aforementioned PCT specification WO 99/04551.

Although the invention has been described with reference to specific examples, it will be appreciated by those skilled in the art that the invention can be embodied in many other forms.

We claim:

1. A sticker printing digital camera device, said device comprising:

a generally circular housing which is suitable for storing a supply roll of a sticker material to be fed from the housing, the housing being configured so that the roll of sticker material can be positioned peripherally within the housing;

a sticker material feed mechanism mounted in the housing for feeding the supply of sticker material from the housing;

an image sensor positioned generally centrally within the housing for sensing an image;

an internal ink jet printhead which is positioned proximate a periphery of the housing and which is operatively associated with said image sensor, the ink jet printhead being adapted to print on to a sticker delivered by said sticker feed mechanism said sensed image or a modification thereof; and an ink delivery arrangement also positioned within the housing for delivering ink to said printhead.

2. A sticker printing camera device as claimed in claim 1 further comprising:

image effect setting means for setting an image effect to be applied to said sensed image; and image processing means interconnected to said image effect setting means and said image sensor and adapted to modify said sensed image in accordance with a current setting of said image effect Setting means.

3. A sticker printing camera device as claimed in claim 2 wherein said image effect setting means comprises a dial or a slider having a plurality of effect images indicated thereon.

4. A sticker printing camera device according to claim 1 wherein said supply roll has a plurality of precut self adhesive stickers.

5. A sticker printing camera device as claimed in claim 1 further comprising cutter means mounted in the housing for severing printed portion of said supply roll.

6. A sticker printing camera device according to claim 1 wherein said printhead is a pagewidth printhead.

* * * * *

UNITED STATES PATENT AND TRADEMARK OFFICE
CERTIFICATE OF CORRECTION

PATENT NO. : 6,276,850 B1
DATED : August 21, 2001
INVENTOR(S) : Kia Silverbrook and Tobin Allen King It is certified that error appears in the above-identified patent and that said Letters Patent is hereby corrected as shown below:

1. A sticker printing digital camera device, said device comprising:

a generally circular housing which is suitable for storing a supply roll of a sticker material to be fed from the housing, the housing being configured so that the roll of sticker material can be positioned peripherally within the housing;

a sticker material feed mechanism mounted in the housing for feeding the supply of sticker material from the housing;

an image sensor positioned generally centrally within the housing for sensing an image;

an internal ink jet printhead which is positioned proximate a periphery of the housing and which is operatively associated with said image sensor, the ink jet printhead being adapted to print on to a sticker delivered by said sticker feed mechanism said sensed image or a modification thereof; and an ink delivery arrangement also positioned within the housing for delivering ink to said printhead.

Signed and Sealed this

Twenty-third Day of April, 2002

*Attest:*

*Attesting Officer*

JAMES E. ROGAN
*Director of the United States Patent and Trademark Office*